United States Patent
Dimmick et al.

(10) Patent No.: US 7,384,191 B2
(45) Date of Patent: Jun. 10, 2008

(54) METHOD AND APPARATUS FOR MEASURING SPATIAL TEMPERATURE DISTRIBUTION OF FLAMES

(75) Inventors: Timothy Eugene Dimmick, Oviedo, FL (US); Kevin Randolph Harper, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 436 days.

(21) Appl. No.: 11/137,899

(22) Filed: May 26, 2005

(65) Prior Publication Data
US 2006/0268956 A1 Nov. 30, 2006

(51) Int. Cl.
*G01K 3/00* (2006.01)
(52) U.S. Cl. .................................................. 374/137
(58) Field of Classification Search ................. 374/137
See application file for complete search history.

(56) References Cited

U.S. PATENT DOCUMENTS

| | | | |
|---|---|---|---|
| 4,142,417 A | 3/1979 | Cashdollar et al. ....... 73/355 R |
| 4,664,173 A | 5/1987 | Jeffers | |
| 5,490,157 A | 2/1996 | Paris et al. | |
| 5,772,323 A | 6/1998 | Felice | 374/127 |
| 6,379,038 B1 | 4/2002 | Felice | 374/128 |
| 6,632,018 B2 | 10/2003 | Isshiki et al. | 374/179 |
| 6,857,776 B2 | 2/2005 | Park | 374/179 |
| 7,004,624 B2* | 2/2006 | Liu | 374/162 |
| 2004/0172976 A1* | 9/2004 | Shimizu | 65/272 |

OTHER PUBLICATIONS

"Control of Optical Fibre Taper Shape" Electronics Letters, IEE Stevenage, GB, vol. 27, No. 18 Aug. 29, 1991, pp. 1654-1656, XP000565113.

* cited by examiner

*Primary Examiner*—Gail Verbitsky
*Assistant Examiner*—Megann E Vaughn
(74) *Attorney, Agent, or Firm*—GrayRobinson, PA

(57) ABSTRACT

A method and apparatus is provided for measuring the spatial temperature distribution of a flame emitted from a burner nozzle for use in the fabrication of tapered optical fibers and fused couplers so that the position of the burner can be calibrated to locate the optical fiber within the most thermally stable part of the flame during production.

7 Claims, 2 Drawing Sheets

METHOD AND APPARATUS FOR MEASURING SPATIAL TEMPERATURE DISTRIBUTION OF FLAMES

FIELD OF THE INVENTION

This invention is directed to a method and apparatus for measuring spatial temperature distribution of flames, and, more particularly, to a method and apparatus for accurately measuring the temperature distribution within the flame produced by a burner nozzle used to fabricate tapered optical fibers and fused couplers.

BACKGROUND OF THE INVENTION

Tapered optical fibers and fused couplers are widely used as low loss all-fiber components in optical fiber communications systems. The typical method of fabricating tapered and fused fiber devices involves heating the fibers in a small flame to soften them as they are drawn and fused. The characteristics of the flame used to soften the optical fibers effects the uniformity of the taper, and therefore the performance of the device. Flames produced by burners have height and width dimensions, which vary in size according to the diameter of the burner nozzle, flow rate of gasses and gas mixture, and, the temperature at various positions within flames of different size is not the same. In order to ensure fabrication repeatability and device uniformity, tapered optical fibers and fused couplers should be manufactured using the most thermally stable part of the flame. It is therefore important to accurately determine the spatial temperature distribution of the flame so that the burner position setting(s) can be calibrated for the fabrication process.

Various techniques have been employed in the past which could be used to either measure the flame temperature directly, or indirectly by measuring the heat radiated from an optical fiber subjected to the flame. For example, spectropyrometers such as disclosed in U.S. Pat. Nos. 6,379,038 and 5,772,323 collect the emitted blackbody radiation from a heated body and use spectral processing to determine the emissivity as a function of wavelength and the absolute temperature of the blackbody. Glass, used to form optical fibers, has low emissivity and radiated light from heated optical fibers is difficult to detect using a spectropyrometer.

Another device for measuring temperature is a thermocouple, such as disclosed in U.S. Pat. Nos. 6,857,776 and 6,632,018. Thermocouples operate based upon the thermoelectric effect at the junction of two dissimilar metals. In response to the application of heat, a voltage is generated across the junction which is proportional to the temperature. The emissivity and conductivity of the metals used in thermocouples is very different from that of glass fibers. Additionally, at the temperature range of interest, e.g., 1700° C. to 1900° C., temperature measurements of thermocouples have a large degree of uncertainty.

Single and multiple wavelength pyrometers are also employed to measure temperature. Devices of this type use infrared radiation to measure temperature, but the accuracy of such measurements is dependent on knowledge of the emissivity of the target material. Emissivity is a property which changes during the heating cycle of most materials, and, as noted above, glass has low emissivity. These factors make it difficult for pyrometers to provide an accurate measurement of the flame temperature applied to an optical fiber.

SUMMARY OF THE INVENTION

This invention is directed to a method and apparatus for measuring the spatial temperature distribution of a flame emitted from a burner nozzle for use in the fabrication of tapered optical fibers.

In the presently preferred embodiment, an optical fiber is held by a pair of vacuum chucks or other mounting structure in position along an X axis. One end of the optical fiber is coupled to a power meter, which, in turn, interfaces with a controller such as a personal computer or the like. The computer is coupled to a motor driver such as a stepper motor or other device capable of moving the burner nozzle relative to the optical fiber within a plane containing a Y axis and a Z axis.

The burner nozzle emits a flame which heats the optical fiber causing it to glow and produce thermally emitted light. The thermally emitted light is transmitted along the optical fiber to the power meter which measures the power of the light. Such measure of light power is considered to be proportional to the temperature of the optical fiber over the discrete length where the fiber is heated by the burner flame. Such power measurements are recorded in the computer.

As noted above, it is important in the fabrication of tapered optical fibers and fused couplers to employ the most thermally stable part of the burner flame in order to ensure fabrication repeatability and device uniformity. The method and apparatus of this invention achieves these goals by accurately measuring the flame shape and temperature distribution within the flame with high spatial resolution. The controller operates the motor driver to move the burner nozzle to various positions with respect to the optical fiber within the plane containing the Y axis and Z axis, both of which are perpendicular to the axis of the optical fiber. The thermally emitted light produced by the optical fiber differs in power according to the position of the flame, since some areas of the flame are hotter than others. The power meter senses the power of the light at each position, and this data is processed in the controller to produce a "map" or representation of the flame shape and temperature distribution within the flame. The most stable area within the flame is readily identified in this manner, and is used to calibrate the position of the burner nozzle relative to the optical fiber during fabrication of tapered optical fibers and fused couplers to obtain repeatable and uniform results.

High spatial resolutions of the flame shape and temperature distribution are provided with the method and apparatus of this invention because the same optical fiber used to form the tapered optical fibers and fused couplers comprises the "sensor" or device used to map the flame. Additionally, direct and accurate data is provided to determine the position setting(s) for the motor driver and burner nozzle thus ensuring that when tapered fibers or fused couplers are fabricated the optical fiber is always located in the most stable part of the flame.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 3:
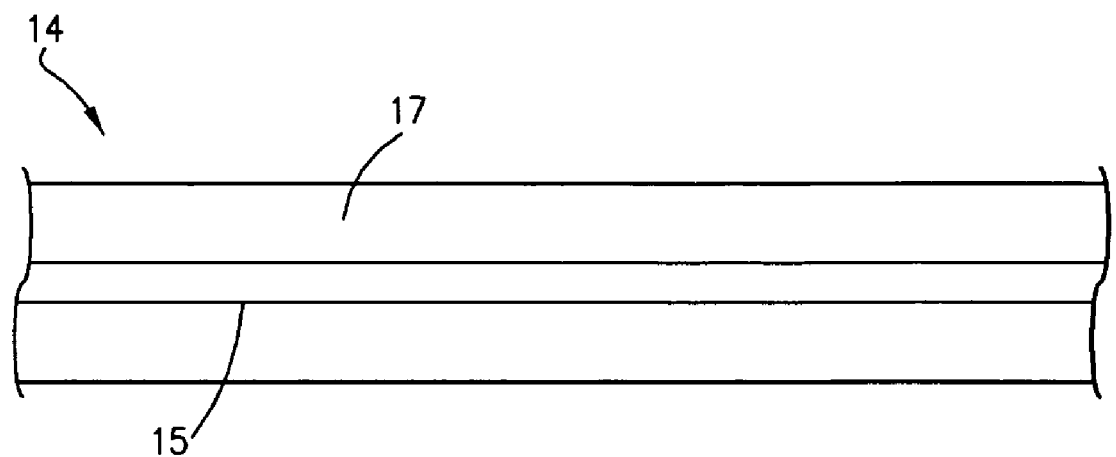
FIG. 3 is a cross sectional, front view of the optical fiber shown in FIG. 1.

Referring now to the Figures, the apparatus of this invention includes a pair of vacuum chucks 10 and 12 which mount an optical fiber 14 along an X axis. As shown in FIG. 3, the optical fiber 14 includes a core 15 surrounded by cladding 17. Although vacuum chucks 10, 12 are illustrated in the drawings, it is contemplated that any other mounting devices could be employed to retain the optical fiber 14 in a fixed position during the measuring process described below. One end of the optical fiber 14 is coupled to a power meter 16 capable of measuring the power of thermally emitted light in watts or a portion of a watt, e.g., milliwatt, etc. One suitable power meter 16 is commercially available under Model No. 81634A from Agilent Technologies of Palo Alto, Calif. The power meter 16 is coupled to a controller, such as a personal computer 18, by a general purpose interface buss or other suitable means. The computer 18, in turn, is coupled to a motor driver 20 such as a stepper motor which is operative to move a burner nozzle 22, and the flame 24 it produces, relative to the optical fiber 14.

Figure 1:
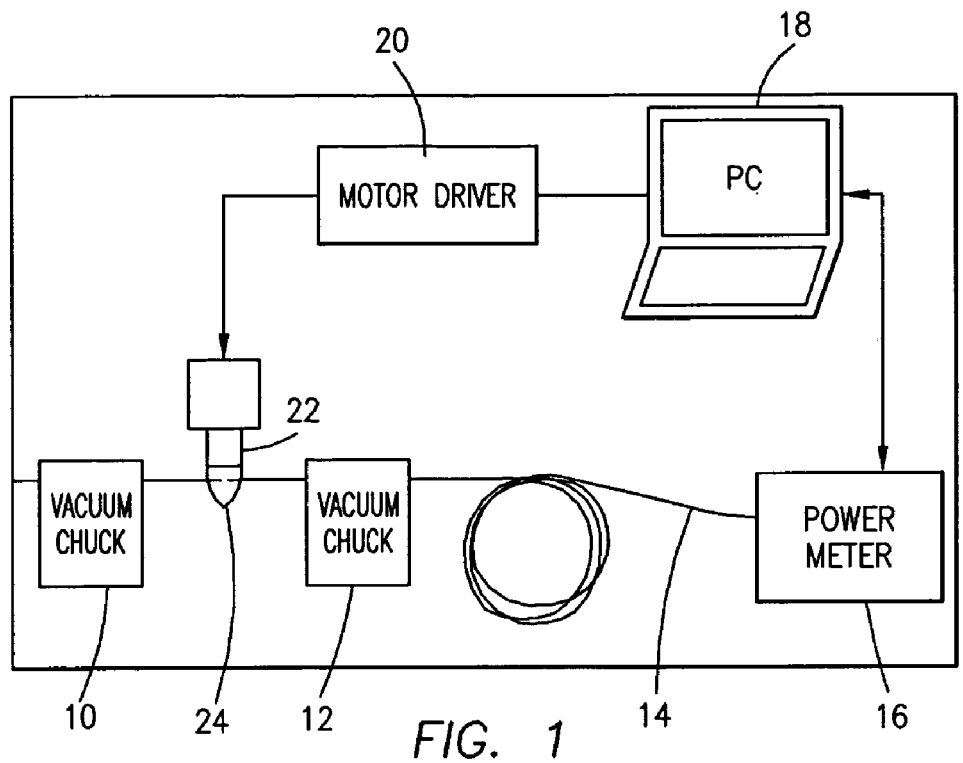
FIG. 1 is a schematic view of the method and apparatus of this invention.
Figure 2:
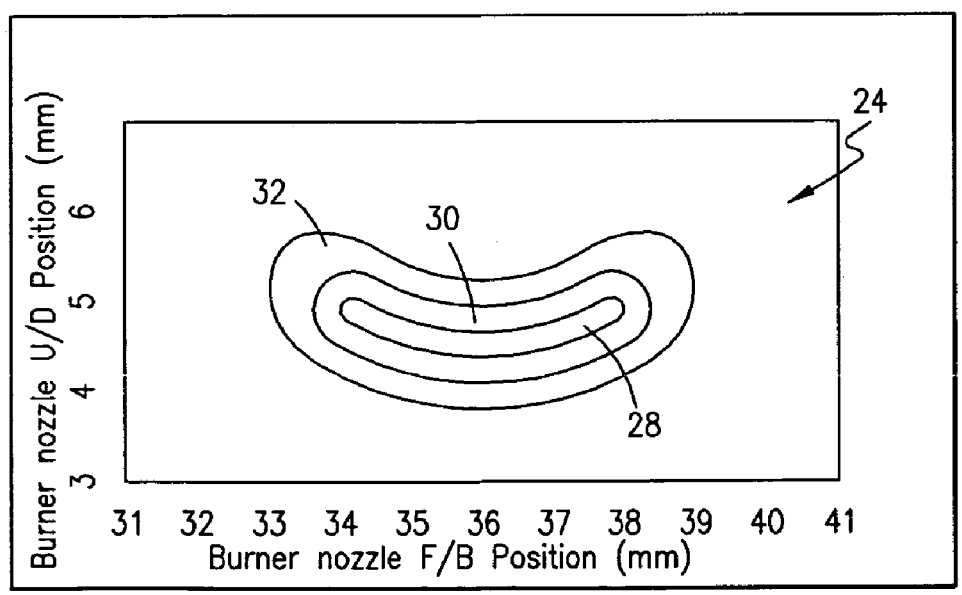
FIG. 2 is a schematic representation, in graphical form, of measurements taken of the flame temperature at different locations of the burner nozzle along the Y axis and Z axis relative to the optical fiber.
Figure 4:
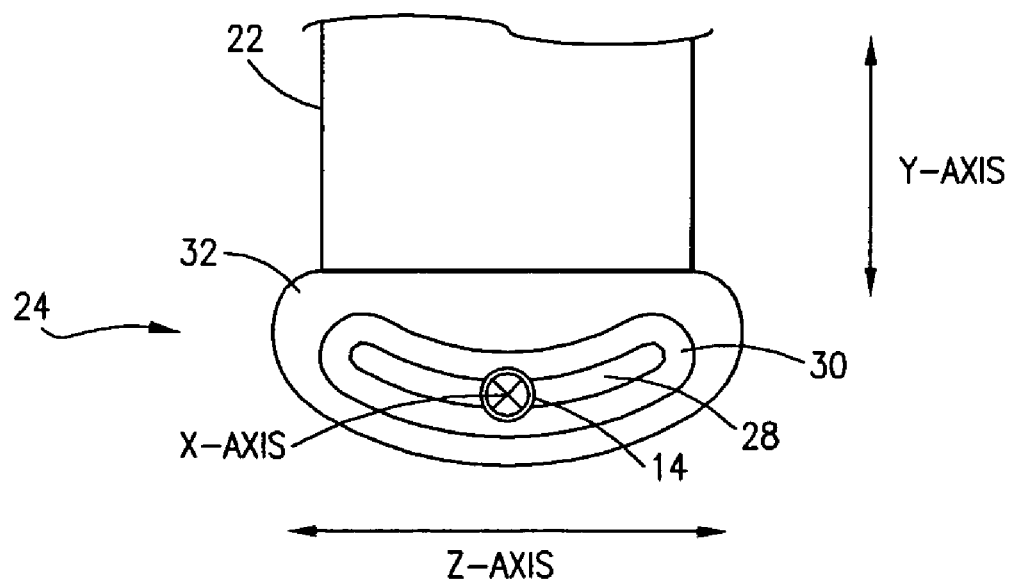
FIG. 4 is an enlarged schematic view of the flame from a burner nozzle, surrounding an optical fiber, depicting the movement of the burner nozzle.

For purposes of this discussion, the X axis refers to the axis of the optical fiber 14 as viewed in FIG. 4, the Y axis is transverse to the X axis and extends vertically in the up and down direction in the orientation of the burner nozzle 22 shown in FIG. 1, and, the Z axis is perpendicular to both the X and Y axes. The flame 24 produced by the burner nozzle 22 has a "height" dimension and a "width" dimension. The height dimension of the flame 24 is measured in the vertical or up and down direction along the Y axis, with the flame oriented as shown in FIGS. 2 and 4. The width dimension of flame 24 is measured along the Z axis, i.e. into and out of the page as viewed in FIG. 1 or from front to back with the flame 24 in the orientation depicted in FIGS. 2 and 4.

It is recognized that the flame 24 produced by the burner nozzle 22 is not the same temperature throughout its height and width. FIG. 2 is a schematic representation of the temperature distribution within a flame 24 measured both in an up/down direction along the Y axis and in the front/back direction along the Z axis. The lines drawn within the body of the flame 24 are intended to denote contours of constant temperature, wherein the area 28 at the center of the flame 24 is the hottest and the areas 30 and 32 are progressively cooler. In order to fabricate tapered optical fibers or fused couplers which are uniform and exhibit the same performance parameters, the position of the burner nozzle 22 should be calibrated so that the optical fiber 14 is always located at the most stable part of its flame 24.

The method of this invention essentially creates a "map" or representation of the shape and temperature distribution within flame 24, with high spatial resolution, to allow for the production of a tapered optical fiber, or a fused coupler (not shown) with accuracy and repeatable results. Initially, the computer 18 operates the motor driver 20 to position the burner nozzle 22 relative to the optical fiber 14 so that its flame 24 heats the optical fiber 14. In response to the application of heat, the optical fiber 14 glows and produces thermally emitted light. The power of that light is proportional to the temperature of the flame 24 along the discrete length of the optical fiber 14 which is heated by the flame 24. The thermally emitted light is transmitted along the optical fiber 14 to the power meter 16 which is effective to sense the light power and provide the computer 18 with a signal representative of the power, and, hence, the magnitude of the temperature of the flame 24. It should be understood that the power meter 16 produces readings of the light power in watts, or a portion thereof, and the computer 18 merely records such readings. No calculation or correlation of power to temperature is conducted by computer 18 in the sense of assigning a temperature value in degrees to a particular power reading. However, the temperature of the burner flame 24 is considered to be proportional to the power reading sensed by the power meter 16.

A "map" or representation of the shape and temperature distribution of the flame 24 is produced by moving the burner nozzle 22 relative to the optic fiber 14. In response to signals from the computer 18, the motor driver 20 causes the burner nozzle 22 to move relative to the optical fiber 14 both up and down in the direction of the Y axis, and front to back in the direction of the Z axis. The Y axis and Z axis lie in the same plane which is perpendicular to the X axis, e.g., the plane of the drawing sheet illustrating FIGS. 3 and 4. The burner nozzle 22 is moved to various positions within that plane, in the direction of both the Y axis and the Z axis, and combinations thereof, so that the optical fiber 14 is exposed to essentially all areas of the flame 24 along both its height dimension and width dimension. As different zones or areas 28, 30 and 32 of the flame 24 engulf the optical fiber 14, it is heated to a greater or lesser extent depending upon its position within the flame 24. In turn, the power of the thermally emitted light produced by the optical fiber 14 varies with its position within the flame 24. The power meter 16 measures the power of the thermally emitted light at each of a number of different locations of the burner nozzle 22 as it transits within the plane perpendicular to the X axis. This data is processed by the computer 18 to map or identify the shape of flame 24 and the temperature distribution within the flame 24. With this information, the position of the burner nozzle 22 can be calibrated so that the optical fiber 14 is located within the most thermally stable part of the flame during fabrication of the tapered optical fiber and/or a fused coupler.

As noted above, the method and apparatus of this invention provide highly accurate spatial resolution of the flame shape and temperature distribution because the device used as a sensor, e.g. the optical fiber 14, is the same item from which tapered optical fibers and fused couplers are made. No guessing as to emissivity or other parameters is needed, unlike some of the instruments disclosed in the prior art to measure temperature. Additionally, direct and accurate position settings for the burner nozzle 22 are obtained from the data sensed by the power meter 16 and processed by the computer 18.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. For example, while the burner nozzle 22 is shown as being coupled to the motor driver 20 so that it moves relative to the optical fiber 14, it is envisioned that the burner nozzle 22 could be held in a fixed position and the optical fiber 14 moved to obtain the measurements described above.

Therefore, it is intended that the invention not be limited to the particular embodiment disclosed as the best mode contemplated for carrying out this invention, but that the invention will include all embodiments falling within the scope of the appended claims.

What is claimed is:

1. A method for measuring spatial temperature distribution of a flame, comprising:
   (a) providing a flame having a height dimension and a width dimension;
   (b) positioning a discrete length of an optical fiber within the flame so that the optical fiber produces thermally emitted light which is transmitted along the optical fiber;
   (c) creating relative movement of the optical fiber and the flame in such a way that the optical fiber is exposed to a number of different areas along the height and the width of the flame;
   (d) measuring the power of the thermally emitted light produced by the optical fiber at each of said number of different areas along the height and width dimensions of the flame, said power measurements being proportional to the spatial temperature distribution of the flame at said discrete length of the optical fiber whereby the spatial temperature distribution of the flame may be determined.

2. The method of claim 1 in which step (c) includes moving the burner nozzle relative to the optical fiber along both the height dimension and the width dimension of the flame.

3. The method of claim 1 in which step (b) includes positioning the optical fiber along an X axis and step (c) includes moving the burner nozzle relative to the optical fiber so that the optical fiber is exposed to a number of different areas along the height and the width of the flame within a plane containing both a Y axis and Z axis which are perpendicular to the X axis.

4. The method of claim 1 in which step (d) includes measuring the power of thermally emitted light transmitted along the optical fiber with a power meter.

5. A method of measuring spatial temperature distribution of a flame, comprising:
   (a) providing a flame having a height dimension and a width dimension;
   (b) positioning a discrete length of an optical fiber along an X axis within the flame, the optical fiber producing thermally emitted light which is transmitted along the optical fiber;
   (c) moving the flame relative to the optical fiber to a number of different positions along the width and the length of the flame within a plane containing both a Y axis and a Z axis which are transverse to the X axis;
   (d) measuring the power of the thermally emitted light produced by the optical fiber at each of said number of different positions relative to the height and width dimensions of the flame, said power measurements being proportional to the spatial temperature distribution of the flame at said discrete length of the optical fiber whereby the spatial temperature distribution of the flame may be determined.

6. Apparatus for measuring spatial temperature distribution of a flame, comprising:
   a burner nozzle movable within a plane containing a Y axis and a Z axis, said burner nozzle emitting a flame having a height dimension and a width dimension;
   a mounting structure for supporting a discrete length of an optical fiber along an X axis, perpendicular to said Y and Z axes, within the flame emitted by said burner nozzle, said optical fiber having a first end and being capable of transmitting thermally emitted light to said first end which is produced when said optical fiber is heated by said flame;
   a power meter coupled to said first end of said optical fiber, said power meter being effective to measure the power of thermally emitted light produced by said optical fiber at each of a number of different locations along said height and width dimensions of said flame as said burner nozzle moves within said plane relative to said optical fiber, said power measurements being proportional to the spatial temperature distribution of the flame at said discrete length of the optical fiber whereby the spatial temperature distribution of the flame may be determined.

7. the apparatus of claim 6 further including a motor driver coupled to said burner nozzle and a controller coupled to said motor driver and to said power meter, said controller being effective to operate said motor driver for moving said burner nozzle within said plane, and to record measurement from said power meter.

* * * * *